July 12, 1966  R. D. LEONARD ETAL  3,260,305

FOLDED RADIATOR DESIGN

Filed Nov. 13, 1963  2 Sheets-Sheet 1

INVENTORS
Rex D. Leonard
Karl Gilbert Soder
BY
J. J. Soucek

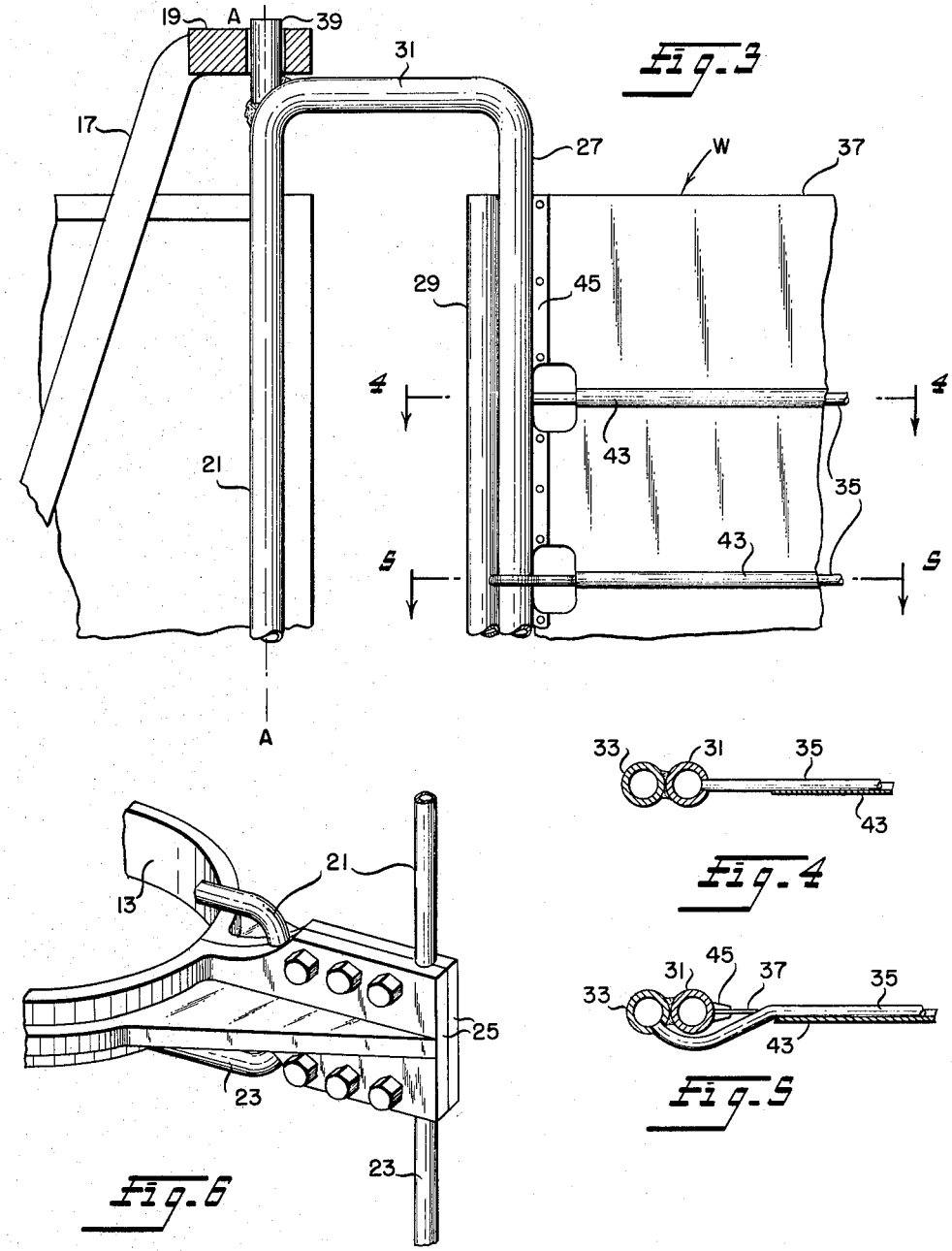

United States Patent Office 3,260,305
Patented July 12, 1966

3,260,305
FOLDED RADIATOR DESIGN
Rex D. Leonard and Karl Gilbert Soder, Indianapolis, Ind., assignors to General Motors Corporation, Detroit, Mich., a corporation of Delaware
Filed Nov. 13, 1963, Ser. No. 323,460
6 Claims. (Cl. 165—67)

This invention relates to flexible heat exchangers and more particularly to flexible heat exchangers suitable for use with a space satellite power plant.

The use of solar energy to operate space satellite power plants has been found desirable due to rocket nose cone weight and size restrictions for launching. However, any unused solar energy must be dissipated in the form of heat, thus necessitating the addition of a heat exchanger to the power plant.

In order to effectively dissipate waste heat, a radiating heat exchanger of sizable dimension is required. Due to the aforementioned dimension restrictions in the nose cone, it is necessary that the heat exchanger be foldable into a compact launch position and yet expandable into efficient operational position.

Any rigid fluid system which is foldable requires the inclusion of joints, seals and structural hinge components, thus adding undesirable weight to the system. A flexible system normally necessitates the use of additional hinge elements to relieve the pivotal area of excessive tensional and compressional stresses.

The principal object of this invention is to provide a flexible heat exchanger for use with a satellite solar power plant which is light in weight and is readily capable of expanding from a compact launch position to an extended operational position.

Another object of the invention is to provide a flexible heat exchanger which is foldable to a position conforming to the peripheral shape of a solar power plant support structure.

Another object is the provision of a flexible heat exchanger which neither requires the use of extra hinge hardware nor subjects the heat exchanger components to excessive tensile or compressive stresses.

A further object is the provision of a flexible heat exchanger which utilizes componental fluid conduits as hinges for the heat exchanger assembly by imparting torsional stresses to these conduits.

A yet further object of this invention is to provide a flexible heat exchanger which, when released from its nose cone confinement, will automatically and accurately assume an operational position by utilizing the torque of the aforesaid torsionally stressed conduits.

Other objects and advantages of this invention will become apparent upon consideration of the specification, the appended claims and the accompanying drawings, wherein:

FIGURE 3 is a fragmentary plan view of part of the structure shown in FIGURE 1, with a typical hinge joint broken away and showing fluid manifolds connected to a heat exchange tube.

FIGURE 4 is a sectional view taken on the line 4—4 of FIGURE 3 showing the connection between the heat exchange tube and the distribution manifold.

FIGURE 5 is a sectional view taken on the line 5—5 of FIGURE 3 showing the connection between the heat exchange tube and the exhaust manifold and further showing the connection between a heat dissipating fin and the distribution manifold.

FIGURE 6 is a perspective view of the rigid connection between the support structure and the fluid conduits.

Figure 1:
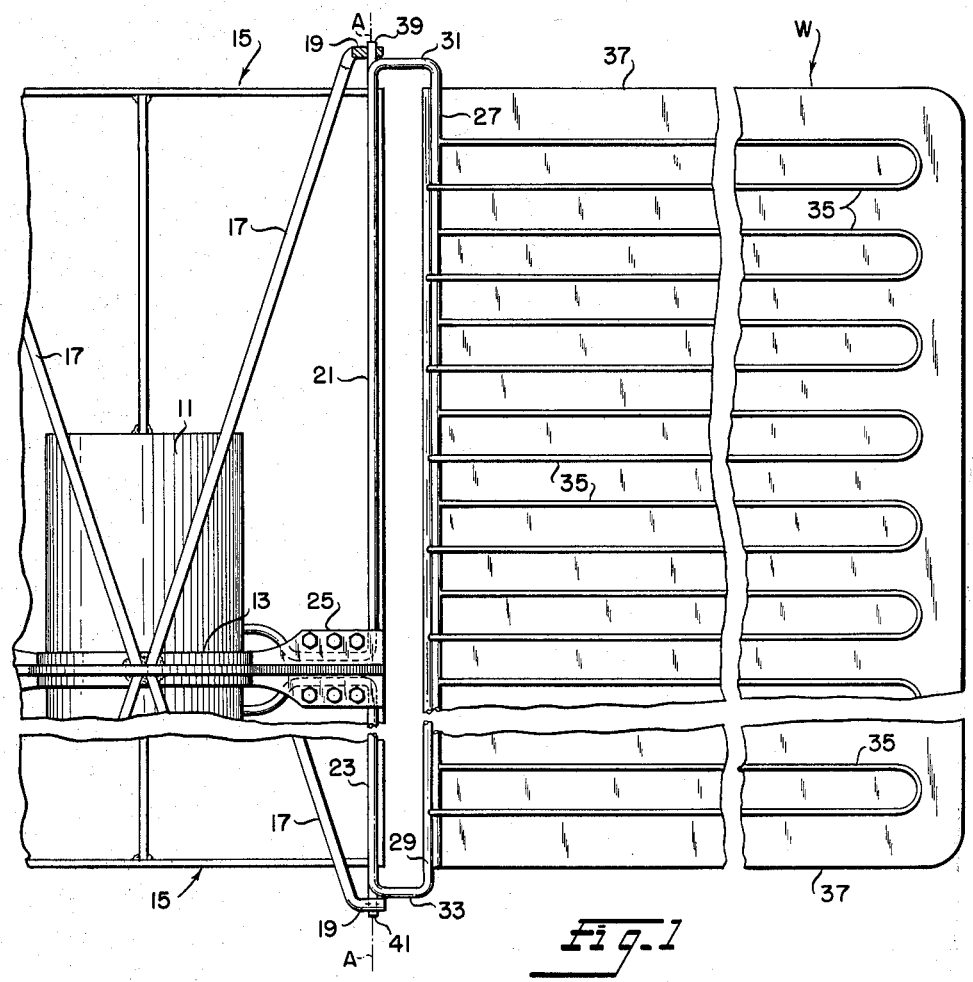
FIGURE 1 is a partial plan view of the preferred embodiment of the invention partially showing a support structure and one heat dissipating wing in its extended operational position.
Figure 2:
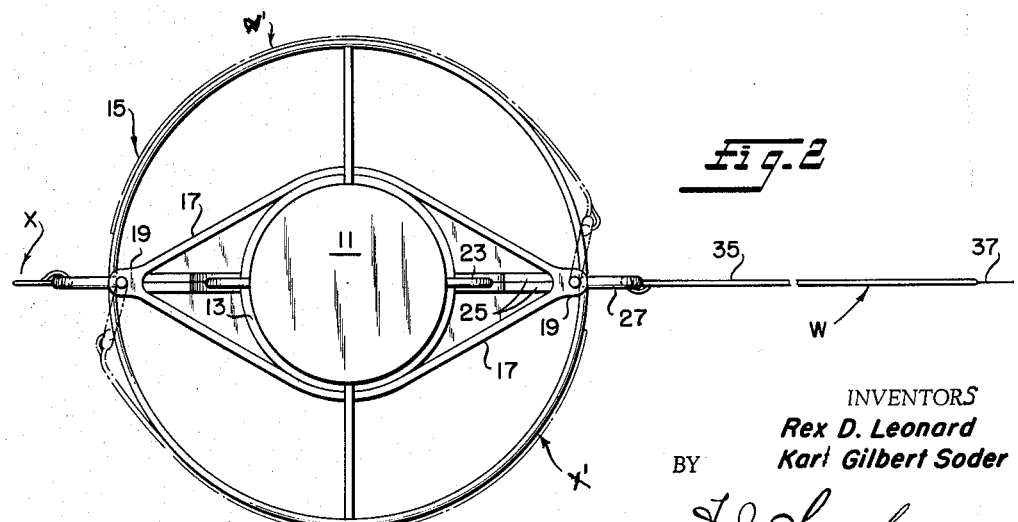
FIGURE 2 is an end view of the structure shown in FIGURE 1, partially showing a second heat dissipating wing, and showing both wings in extended operating position and, in broken lines, in folded stored position.

Referring to FIGURES 1 and 2, a solar power plant 11 suitable for use in space is held by a collar 13 in a skeletal support structure 15 which includes outwardly extending pairs of struts 17 terminating in journal members 19. Supply and exhaust conduits 21 and 23, respectively, lead from the power plant 11 through rigid clamping plates 25 of the support structure 15 and extend oppositely therefrom in axial alignment between the journal members 19. The fluid conduits 21, 23 bend at the journals 19 and are integrally connected to supply and exhaust fluid manifolds 27 and 29 by means of connector conduits 31 and 33, respectively. A plurality of flexible heat exchange tubes 35 are each connected to both the supply and exhaust manifolds 27, 29. A large heat dissipating fin 37 mutually connects the heat exchange tubes 35 in uniplanar relationship forming a heat exchanger wing W. As shown in FIGURE 2, the structure includes an identical pair of such wings W, X, shown in extended operational position although one large or a plurality of small wings could be used. The journal members 19 are aligned on axis A—A and receive extensions 39, 41 of the fluid conduits 21, 23 as hinge pivots.

The structure of the hinge joints are identical and thus only one is shown in FIGURE 3 for purposes of illustration. The extension 39 is shown welded onto the end of the supply conduit 21 and is pivotally received in the journal member 19. The conduit could be supported in journal member 19 in any known manner, but the embodiment shown is preferred since it prevents any possible rotational damage to conduit 21 and provides a guard for connector conduit 31. The heat dissipating fin 37 is deformed to provide grooves 43 for receiving the tubes 35 in nesting relationship. The tubes 35 may be secured within these grooves 43 by any known means such as brazing, clamping or spot welding.

The heat exchange tubes 35 and the supply and exhaust manifolds 27, 29 are connected, as shown in FIGURES 4 and 5. The heat dissipating fin 37 is connected to the supply manifold 27 by means of a riveted connector strip 45. The supply and exhaust conduits 21, 23 are rigidly secured by a pair of clamping plates 25 to collar 13 as disclosed in FIGURE 6. The clamping plates 25 may be bolted as shown, or any other means such as welding may be used to secure the conduits 21, 23 to the support structure 15.

In the above manner the supply and exhaust conduits 21, 23 serve the dual purpose of providing a fluid connection between the power plant 11 and the manifolds 27, 29 and of providing a mechanical connection between the support structure 15 and the heat dissipating wings W, X.

In operation, the journalled extensions 39, 41 of the fluid conduits 21, 23 and the central clamping plates 25 form a torsion bar or torque tube arrangement, wherein the conduits themselves serve as hollow torsion bars or torque tubes. These conduits 21, 23 may be denoted "fluid carrying torque tubes" to best define their functions which include (1) serving as fluid connections and (2) operating as hollow torsion bars or torque tubes. Such mechanical function may be analogized to that of an ordinary torsion bar spring, such as used, for example, on many of today's automobiles to store energy via torsional stressing of the bar. In this manner, heat exchange wings W may be rotated about axis A—A into stored position W' as shown in FIGURE 2; the operation of the wing X is identical. The flexibility of the heat exchange wings W, X permits a substantial conformance with the peripheral shape of the support structure 15.

The stored position W', X' must be assumed by the heat exchange wings W, X for insertion into a rocket nose cone (not shown), Upon successful launching and assumption of the proper placement in space, the power plant assembly is expelled from the nose cone or the nose cone is separated from the power plant assembly, thus permitting the heat exchange wings W, X to spring into extended position. This assumption of the operating extended position is due to the torque supplied by the torsionally stressed fluid conduits 21, 23 and the natural resiliency of the flexible heat dissipation wings W, X. The wings W, X may have their ends tethered during stored relationship and an automatic actuator may then be utilized to release the wings, or the wings may simply be confined within the nose cone without tethering.

Thus, this invention provides a flexible heat exchanger for use with a solar power plant which may be folded into compact position and yet resume an efficient operational position when desired, without the use of undesirable additional hardware.

It should be understood that the foregoing disclosure relates only to a preferred embodiment of the invention and that it is intended to cover all changes and modifications which do not depart from the spirit and scope of the invention.

What is claimed is:

1. A rotatable heat exchanger comprising a support structure including a journal member; fluid supply means including a fluid carrying torque tube having a portion fixed to said support structure and a spaced portion rotatably supported in said journal member to define an axis of rotation; flexible fluid system heat transfer means rotatable about said axis from a flat position extending from said structure to a folded position about said structure, said means including a fluid manifold rigidly connected to and in fluid communication with said torque tube and lying in a plane containing said axis whereby rotation of said heat transfer means about said axis relative to said support structure from said flat position to said stored position torsionally stresses said torque tube.

2. A rotatable heat exchanger comprising a support structure including a journal member; fluid supply means carried by said structure including a fluid carrying torque tube having a portion fixed to said support structure and a spaced portion rotatably supported in said journal member to define an axis of rotation; and heat transfer means rotatable about said axis from a flat position extending from said structure to a folded position about said structure, said means comprising a plurality of fluid carrying tubes and a fluid manifold rigidly connected to and in fluid communication with said fluid carrying tubes and said torque tube, whereby rotation of said heat transfer means about said axis relative to said support structure from said flat position to said folded position torsionally stresses said torque tube.

3. A rotatable heat exchanger comprising a support structure including a pair of spaced journal members defining an axis of rotation; fluid supply means including a pair of fluid carrying torque tubes each having a portion fixed to said support structure and a spaced portion rotatably supported in one of said journal members; and a fluid containing heat transfer means rigidly connected to and in fluid communication with said torque tubes and rotatable about said axis from a flat position extending from said structure to a folded position about said structure, whereby rotation of said heat transfer means about said axis relative to said support structure from said flat position to said folded position torsionally stresses said torque tubes.

4. A rotatable heat exchanger comprising a support structure including a pair of spaced journal members defining an axis of rotation; fluid supply means carried by said structure including a pair of fluid carrying torque tubes extending along said axis and each having a portion rigidly fixed to said support structure and a spaced portion rotatably supported in one of said journal members; and flexible heat transfer means rotatable about said axis from a flat position extending from said structure to a folded position about said structure, said means comprising a pair of fluid manifolds rigidly connected to and in fluid communication with said torque tubes and a plurality of fluid carrying heat transfer tubes connected to said manifolds, whereby rotation of said heat transfer means about said axis relative to said structure from said flat position to said folded position torsionally stresses said torque tubes.

5. A rotatable heat exchanger comprising a support structure including a pair of spaced journal members defining an axis of rotation; fluid supply means carried by said structure including a pair of fluid carrying torque tubes each having a portion rotatably supported in one of said journal members and extending along said axis to a point of rigid attachment to said support structure between said journal members; and flexible heat transfer means rotatable about said axis from a flat position extending from said structure to a folded position about said structure, said means comprising a normally flat flexible fin, a plurality of fluid carrying heat exchange tubes attached to said fin and a fluid supply manifold and a fluid exhaust manifold each connected to each of said heat exchange tubes and rigidly connected to and in fluid communication with one of said torque tubes, whereby rotation of said heat transfer means about said axis relative to said structure from said flat position to said folded position torsionally stresses said torque tubes.

6. A rotatable heat exchanger comprising a cylindrical support structure including a pair of spaced journal members forming an axis of rotation parallel to the longitudinal axis of the support structure; fluid supply means carried by said structure including a pair of fluid carrying torque tubes each having a rigid extension rotatably supported in one of said journal members and extending inwardly therefrom along said axis to a point of mutual rigid attachment to said structure; and flexible heat transfer means rotatable about said axis from a flat position extending from said structure to a folded position about said structure, said means comprising a normally flat flexible fin, a plurality of parallel fluid carrying heat exchange tubes attached to said fin, and a fluid supply manifold and a fluid exhaust manifold each connected to each of said heat exchange tubes and rigidly connected to and in fluid communication with one of said torque tubes, whereby rotation of said heat transfer means about said axis relative to said structure from said flat position to said folded position torsionally stresses said torque tubes.

References Cited by the Examiner

UNITED STATES PATENTS

| | | | |
|---|---|---|---|
| 2,062,864 | 12/1936 | Clark et al. | 165—46 |
| 2,190,584 | 2/1940 | Feldmeier et al. | 165—70 |
| 2,211,514 | 8/1940 | Newhall | 165—7 |
| 2,753,435 | 7/1956 | Jepson | 165—46 X |
| 3,113,614 | 12/1963 | Schubert et al. | 165—67 |

FOREIGN PATENTS 1,045,678  7/1953  France.

ROBERT A. O'LEARY, *Primary Examiner.*

CHARLES SUKALO, *Examiner.*

M. A. ANTONAKAS, *Assistant Examiner.*